United States Patent
Chung

(10) Patent No.: US 12,244,981 B2
(45) Date of Patent: Mar. 4, 2025

(54) IDENTIFICATION DEVICE FOR CONNECTION CABLES IN TELECOMMUNICATION-NETWORK JUMPER BOARDS

(71) Applicant: FURUKAWA ELECTRIC LATAM S.A., Curitiba (BR)

(72) Inventor: Nicolas Chung, Curitiba (BR)

(73) Assignee: FURUKAWA ELECTRIC LATAM S.A., Curitiba (BR)

( * ) Notice: Subject to any disclaimer, the term of this patent is extended or adjusted under 35 U.S.C. 154(b) by 355 days.

(21) Appl. No.: 17/996,842

(22) PCT Filed: Apr. 19, 2021

(86) PCT No.: PCT/BR2021/050162
§ 371 (c)(1),
(2) Date: Oct. 21, 2022

(87) PCT Pub. No.: WO2021/212194
PCT Pub. Date: Oct. 28, 2021

(65) Prior Publication Data
US 2023/0164465 A1    May 25, 2023

(30) Foreign Application Priority Data
Apr. 22, 2020 (BR) ............ 10 2020 008029 6

(51) Int. Cl.
*H04Q 1/02* (2006.01)
*G06K 19/07* (2006.01)
(Continued)

(52) U.S. Cl.
CPC ......... *H04Q 1/138* (2013.01); *G06K 19/0723* (2013.01); *H01R 13/506* (2013.01);
(Continued)

(58) Field of Classification Search
CPC .......... H04Q 1/138; H04Q 1/136; H04Q 1/02; G06K 19/0723; G06K 19/077;
(Continued)

(56) References Cited

U.S. PATENT DOCUMENTS 7,526,582 B2    4/2009   Best et al.
7,605,707 B2   10/2009   German et al.
(Continued)

FOREIGN PATENT DOCUMENTS

BR   102017021868 A2   5/2019
EP       1820355 B1    2/2015

OTHER PUBLICATIONS

International Search Report for Corresponding International Application No. PCT/BR2021/050162, 4 pages, Jun. 25, 2021.

*Primary Examiner* — Briggitte R. Hammond
(74) *Attorney, Agent, or Firm* — LUCAS & MERCANTI, LLP

(57) ABSTRACT

Each of the opposite ends of a patch cord carries a connector (20), wherein the identifier device (ID) has a body (30) in a "U" shape, having a basic leg (31) to be seated against an upper face (21) of the connector (20) and provided with an outwardly facing housing (33) and with at least one projection (34) facing inwardly of the body (30) and to be fitted inside of a crimping cavity (25) of the connector (20), the body (30) further having two side legs (32) than can be seated against respective opposite side faces (22) of the connector (20) and incorporating an inner end tooth (35) to be seated against the lower face (23) of the connector (20); an identifier tag (40) positioned on the housing (33); and a cover (50) closing the housing (33) and retaining the identifier tag (40) within the latter.

8 Claims, 5 Drawing Sheets

(51) Int. Cl.
    *H01R 13/506*     (2006.01)
    *H01R 13/66*     (2006.01)
    *H01R 24/64*     (2011.01)

(52) U.S. Cl.
    CPC ......... *H01R 13/6691* (2013.01); *H01R 24/64* (2013.01); *H01R 2201/04* (2013.01)

(58) Field of Classification Search
    CPC .. H01R 13/506; H01R 13/6691; H01R 24/64; H01R 2201/04; H01R 13/465; H01R 31/06; H01R 13/518; H01R 29/00; H01R 13/46
    See application file for complete search history.

(56) References Cited

U.S. PATENT DOCUMENTS

| | | | |
|---|---|---|---|
| 7,794,270 B1 | 9/2010 | Lin et al. | |
| 8,171,468 B2 | 5/2012 | Larsson et al. | |
| 8,427,335 B2 | 4/2013 | Caveney et al. | |
| 8,665,107 B2 | 3/2014 | Caveney et al. | |
| 9,331,426 B2 * | 5/2016 | Adams | H01R 13/6273 |
| 9,380,358 B2 * | 6/2016 | Caveney | H04Q 1/138 |
| 9,924,241 B2 * | 3/2018 | Shih | H01R 24/64 |
| 10,136,195 B2 * | 11/2018 | Ding | H01R 13/64 |
| 2005/0232636 A1 | 10/2005 | Durrant et al. | |
| 2010/0098425 A1 | 4/2010 | Kewitsch | |
| 2010/0210135 A1 | 8/2010 | German et al. | |
| 2013/0256413 A1 | 10/2013 | Standish et al. | |
| 2015/0199603 A1 | 7/2015 | Troeger et al. | |
| 2017/0315167 A1 * | 11/2017 | Bai | G01R 31/66 |

* cited by examiner

IDENTIFICATION DEVICE FOR CONNECTION CABLES IN TELECOMMUNICATION-NETWORK JUMPER BOARDS

CROSS REFERENCE TO RELATED APPLICATION

This Application is a 371 of PCT/BR2021/050162 filed on Apr. 19, 2021 which, in turn, claimed the priority of Brazilian Patent Application No. BR 10 2020 008029 6 filed on Apr. 22, 2020, both applications are incorporated herein by reference.

FIELD OF THE INVENTION

The present invention refers to an identifier device to be applied to each end connector of a patch cord used to interconnect, in an organized way, a respective pair of patch panel ports of different digital or analog data telecommunication lines in different applications.

BACKGROUND OF THE INVENTION

Installations of telecommunication network patch panels are well known in the state of the art, which comprise a plurality of panel ports to be interconnected, two by two, in a previously ordered manner, by a patch cord having, at each end, a connector to be fitted and retained in a respective port of a pair of panel ports, one port being connected, generally at the rear region of the panel, to a (so-called external) telecommunication line, by for example a connection to a network switch, router or PBX, while the other port of the pair is connected, also usually by the rear region of the panel, to another (so-called internal) telecommunication line, for example a local network point or socket where a computer, telephone, printer, server or other equipment will be connected.

The patch cord allows the organized connection of each pair of panel ports, according to an order that can be rearranged, at any time, according to the varying operational requirements of each installation, requiring the operator to carefully note the ports to have their interconnection performed by a respective patch cord.

In installations with a high number of patch panels and panel ports, the operator in charge of implementing or rearranging the interconnections is obliged to expend effort and time to overcome the usual difficulties to safely locate the panel ports to have their interconnection carried out or rearranged, with an effective risk of interconnection errors that will also require efforts to detect and correct the same, particularly in installations with a high number of telecommunication lines to have their interconnections effected, complemented or rearranged.

Due to the inconveniences of the operations of effecting, complementing and reordering of interconnections between the panel ports, made by means of manual notes to be followed by the operators, computerized systems were proposed for tracking and individual identification of the interconnection of each two of patch panel ports by a patch cord. In this type of interconnection system, each of the opposite ends of each patch cord carries a connector on which an identifier tag is fixed, containing individual identification data of each patch cord to be applied to the patch panels that are usually mounted in a structure arranged in a space, for example, a room of generally restricted access.

In these installations, the patch panels have each panel port operatively associated with a sensor capable of reading the data contained in the identifier tag of the connector that is fitted to a respective patch panel port. A controller device is operatively associated with the patch panels to identify/track whether certain patch cords have their connectors connected to the patch panel port pairs, in the desired order.

In a known solution, described in U.S. Pat. No. 7,605,707, on each of the end connectors of a patch cord, an RFID identifier tag is fixed with a microchip containing the unique identification data of the respective patch cord, to be detected by an RF antenna provided in each respective panel port, when the respective connector of a patch cord is plugged into or unplugged from the same. The signals detected by the RF antenna are then transmitted to a reader device provided with a processor that transforms the RF antenna signals into digital data to be stored in a database of a computerized controller device, which records the connectivity condition of the patch cord, allowing the identification of each two panel ports that are interconnected by the same patch cord or that have been disconnected from each other.

This previous solution has, as an inconvenience, the fact that it requires communication on radio frequencies from 868 MHz to 950 MHz, or in the 2.4 GHz band. These frequencies are quite high, making the circuits and components necessary to carry, switch and read the signals complex, leading to a very high-cost solution that does not present global standardization, as to each country or region (USA, Europe, Japan and others) having different requirements, with the need of local adaptations.

Other identification systems using RFID can be seen in patent documents U.S. Pat. Nos. 8,665,107; 8,427,335; and 8,171,468, which have at least some of the drawbacks discussed above.

Patent application BR 10 2017 021868-6, by the applicant, describes and claims a solution to allow an easy and secure visual and individual identification not only of each pair of patch panels ports, as well as the respective patch cords, using reduced power and low frequency for wireless communication between each patch cord and the panel ports, indicating and identifying the connection or disconnection of the ports of each pair of ports and also allowing a simple and fast insertion of data in the identifier tags already fixed in the respective end connectors of a patch cord with the latter already interconnecting two panel ports.

In this previous solution of the applicant, the identifier tags are housed in a respective recess provided in the end connector body, being fixed there generally by adhesive, being exposed to the dirt and humidity of the installation environment and accessible manually, without the need for disconnection of the connector from the respective panel port, thus being subject to possible involuntary mechanical interference and the wear of the adhesive over time.

Despite the advantages over the prior art, the aforementioned previous solution by the applicant requires the provision of patch cords already manufactured with the end connectors carrying the identifier tags. Thus, in case it is desired to provide an installation, originally devoid of automatic identification means of the connections, with a computerized system of visual and individual identification of each pair of ports of patch panels and the respective patch cords, the patch cords in the installed condition will not be able to receive the identifier tags, requiring their replacement by patch cords with the end connectors carrying the identifier tags.

In order to provide greater flexibility to the construction of patch cords with connectors carrying the respective identifier tags, another solution was proposed, still by the prior art, comprising an identifier device formed by a tag holder body configured to be mounted around each end connector and to carry, attached by adhesive, an identifier tag. According to this other solution of the prior art, a common patch cord can have its end connectors provided with respective identifier tags by mounting an identifier device on whose body an identifier tag is fixed, by adhesive.

Despite leading to an advantageous versatility in terms of providing identifier tags to connectors of patch cords of conventional construction, this other prior art solution uses an identifier device having a body formed in two pieces to be fitted and locked to each other, around the body of the connector, one of the forming parts of the body receiving, externally, the gluing of an identifier tag with a microchip containing the unique identification data of the respective patch cord.

This previous solution, mentioned above, has a construction that leads to an assembly that is difficult to access with the connector kept fitted in a patch panel port. In order to assemble this identifier device with a body formed in two parts, the installer is required to access the upper and lower faces of the connector, which makes this operation very difficult, if not impractical in the field, with the connector already installed in a panel port, with its lower face virtually inaccessible.

The aforementioned other previous solution presents the body of the identifier device formed in two pieces fitted into and locked to each other by exposed and easily accessible locking means, allowing the disassembly of the body from the tag holder device, with the connector remaining seated in a respective port of the patch panel, without the operation conduction being highlighted. The safety of the mounting is fragile. In addition, the identifier tag is externally attached to the body of the identifier device by means of an adhesive, with which the tag is exposed to the environment, without any protection, being able to come off with the time, depending on the deterioration of the adhesive.

SUMMARY OF THE INVENTION

Due to the aforementioned drawbacks, the present invention aims at providing an identifier device to be applied to each end connector of a patch cord, to interconnect a pair of ports of patch panels, which comprises a tag-holder body of simple and robust construction, to be easily and quickly fitted and retained around an end connector of a patch cord and having an identifier tag securely housed and protected therein, in the form of a tag containing passive electronic memory and capable of communicating, via radio frequency (RF), and of storing identification data of the respective patch cord, with the tag-holder body and the identifier tag kept retained, so as not to be removed, except in a destructive manner, in relation to the end connector, the latter being kept fitted in the respective port of the patch panel.

The identifier tags used in the identifier device in question operate together with readers based on Near Field Communication (NFC) according to the ISO/IEC 14443 standard, being positioned externally to the elements involved in the "End connector/Panel Port" connections, which elements can thus continue to exactly follow industry compatibility standards.

The device of the invention is applied to patch cords with each of their opposite ends carrying a connector having an upper face provided with a crimping cavity, opposite side faces and a lower face.

According to the invention, the identifier device comprises: a one-piece "U" shaped body, having a basic leg to be seated against the upper face of a connector and provided with a housing and at least one projection to be fitted inside the crimping cavity of the connector, the body also having two side legs to be seated against the respective opposite side faces of the connector and each incorporating an inner end tooth to be seated against the lower face of the connector.

The device also comprises an identifier tag, containing passive electronic memory and positioned inside the housing; and a cover attachable to the basic leg of the body, closing the housing and retaining the identifier tag within the latter.

BRIEF DESCRIPTION OF DRAWINGS

The invention will be described below, with reference to the attached drawings, given by way of example of a possible embodiment of the identifier device and in which.

DESCRIPTION OF THE INVENTION

Figure 1:
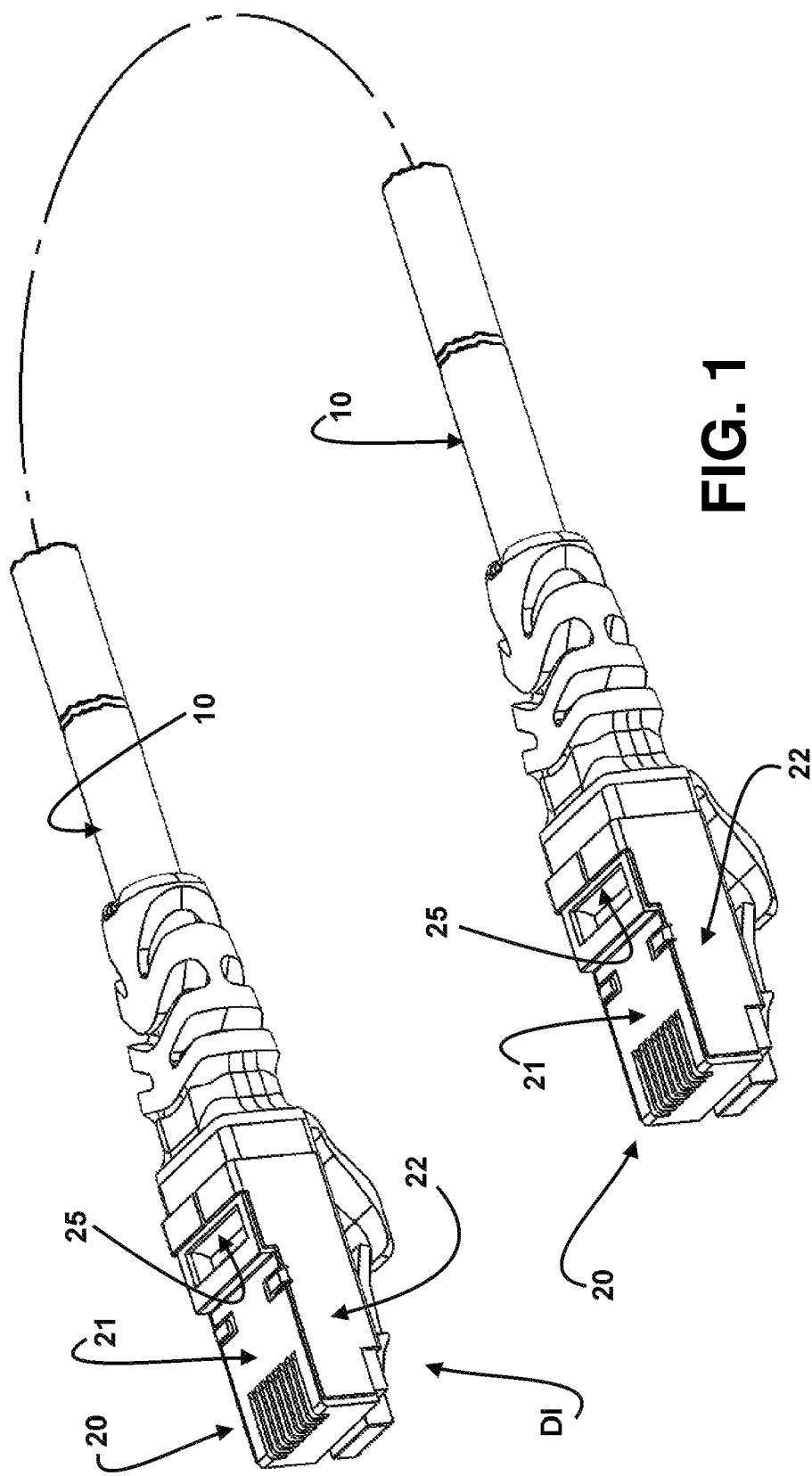
FIG. 1 represents a perspective view of a patch cord provided with a pair of RJ-45 end connectors, each having its upper face provided with a crimping cavity.
Figure 2:
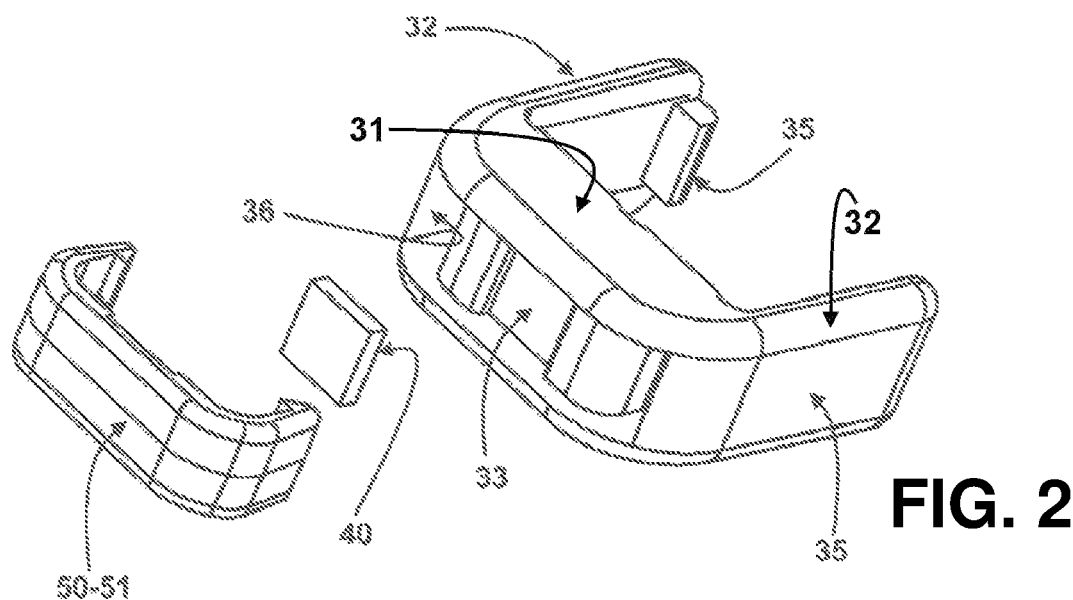
FIG. 2 represents an exploded perspective view of the identifier device, illustrating the tag holder body, with the tag housing open, the cover of the tag housing and the tag itself.
Figure 3:
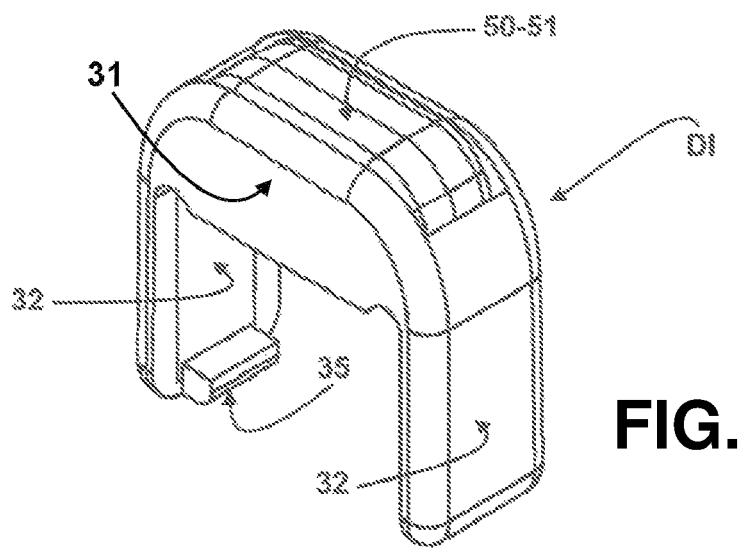
FIGS. 3 and 4 represent perspective views of the tag holder body with the cover mounted and closing the tag housing.
Figure 4:
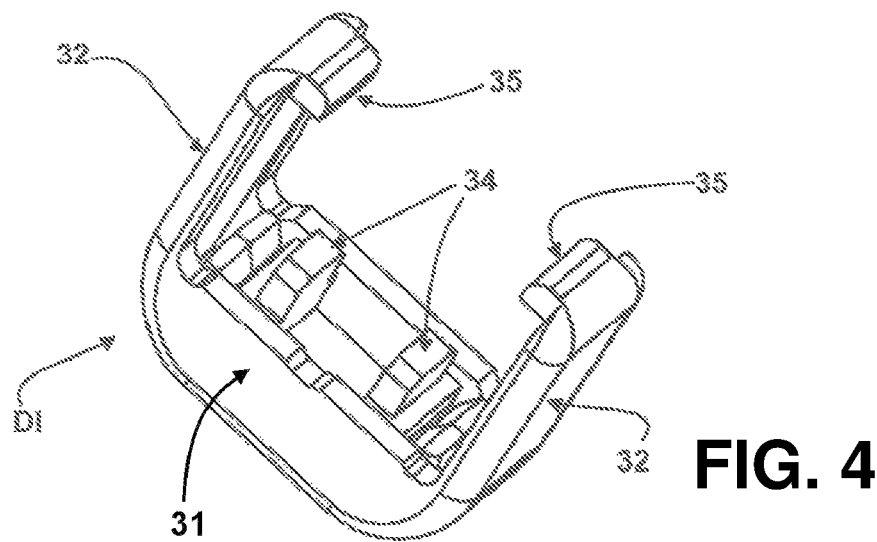
Figure 5:
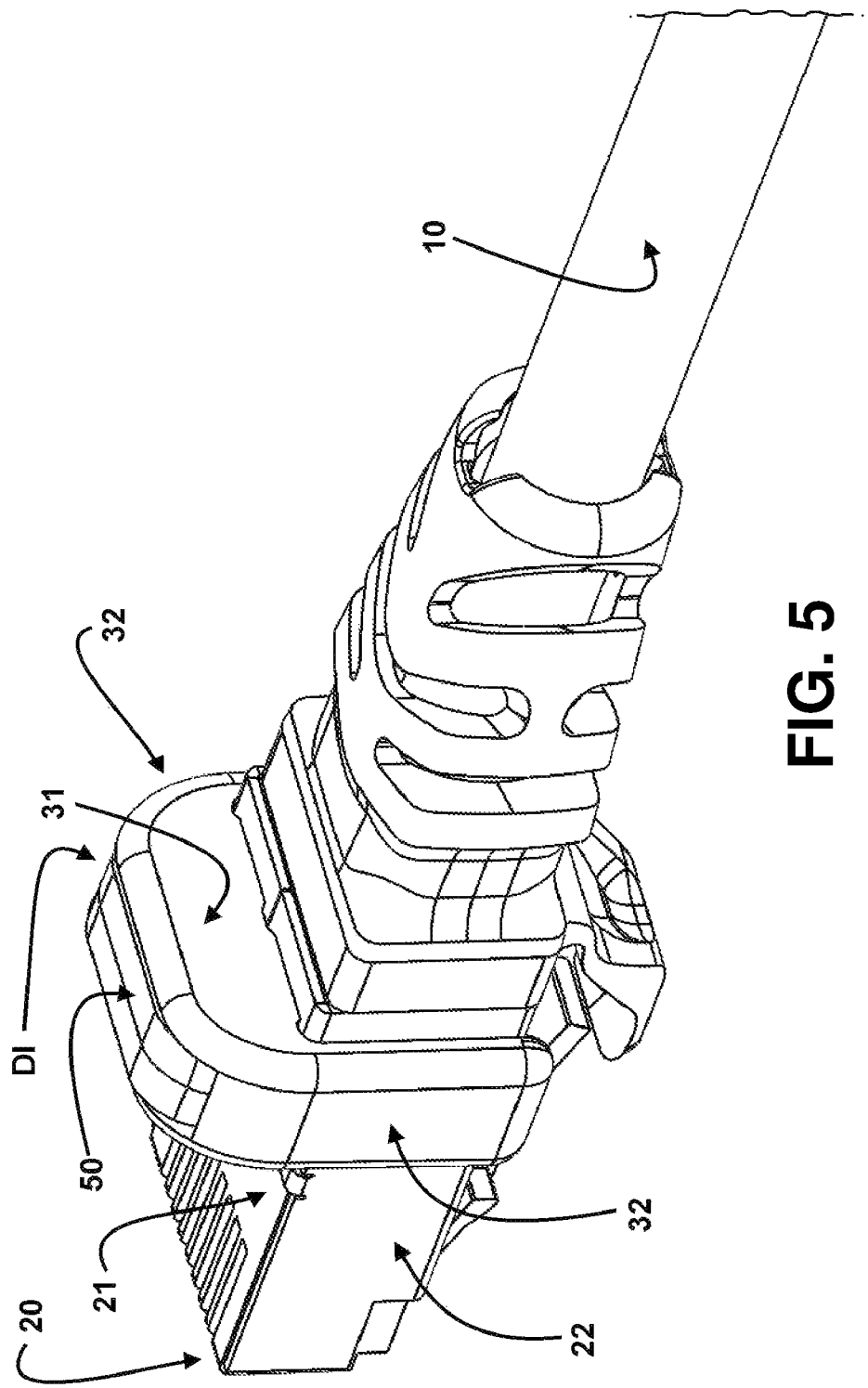
FIG. 5 represents a perspective view of an end connector carrying an identifier device with the housing cover in the assembled and closed condition.
Figure 6:
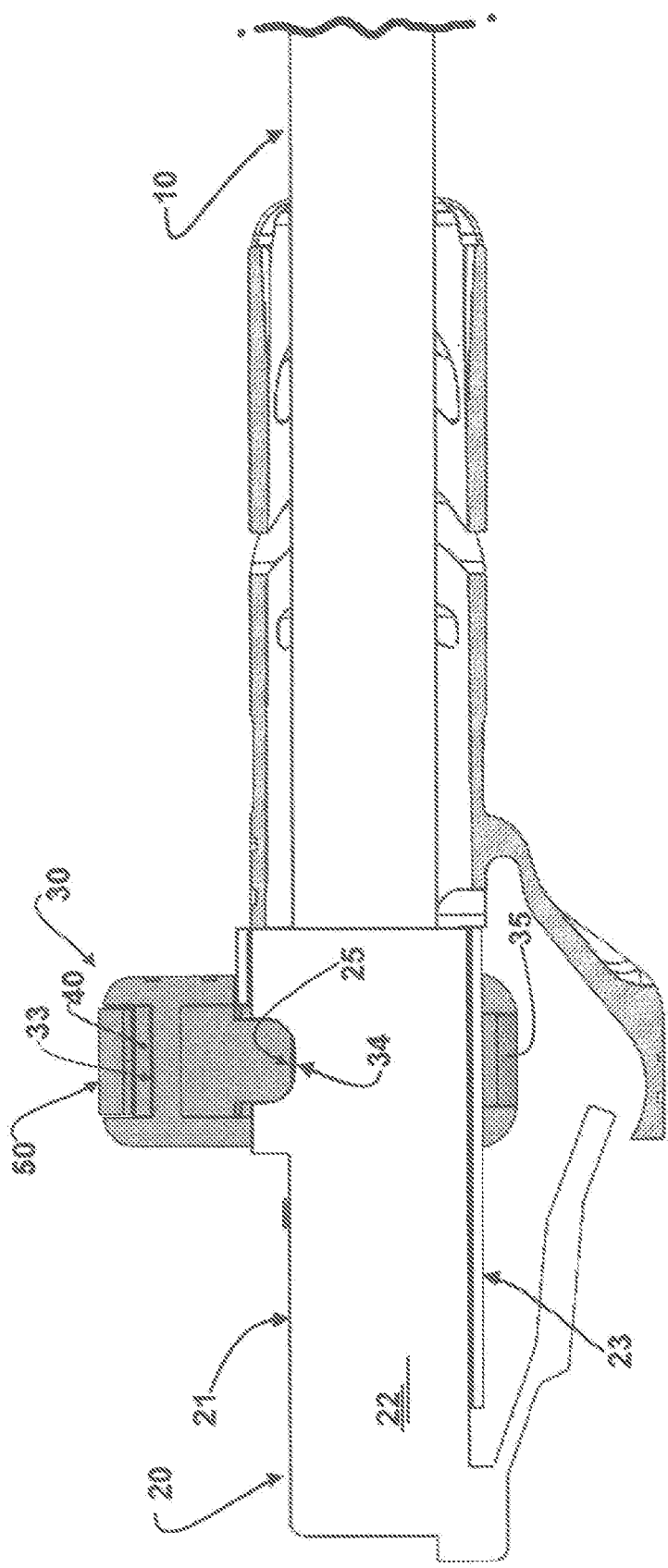
FIG. 6 represents a longitudinal sectional view of the set illustrated in FIG. 5.
Figure 7:
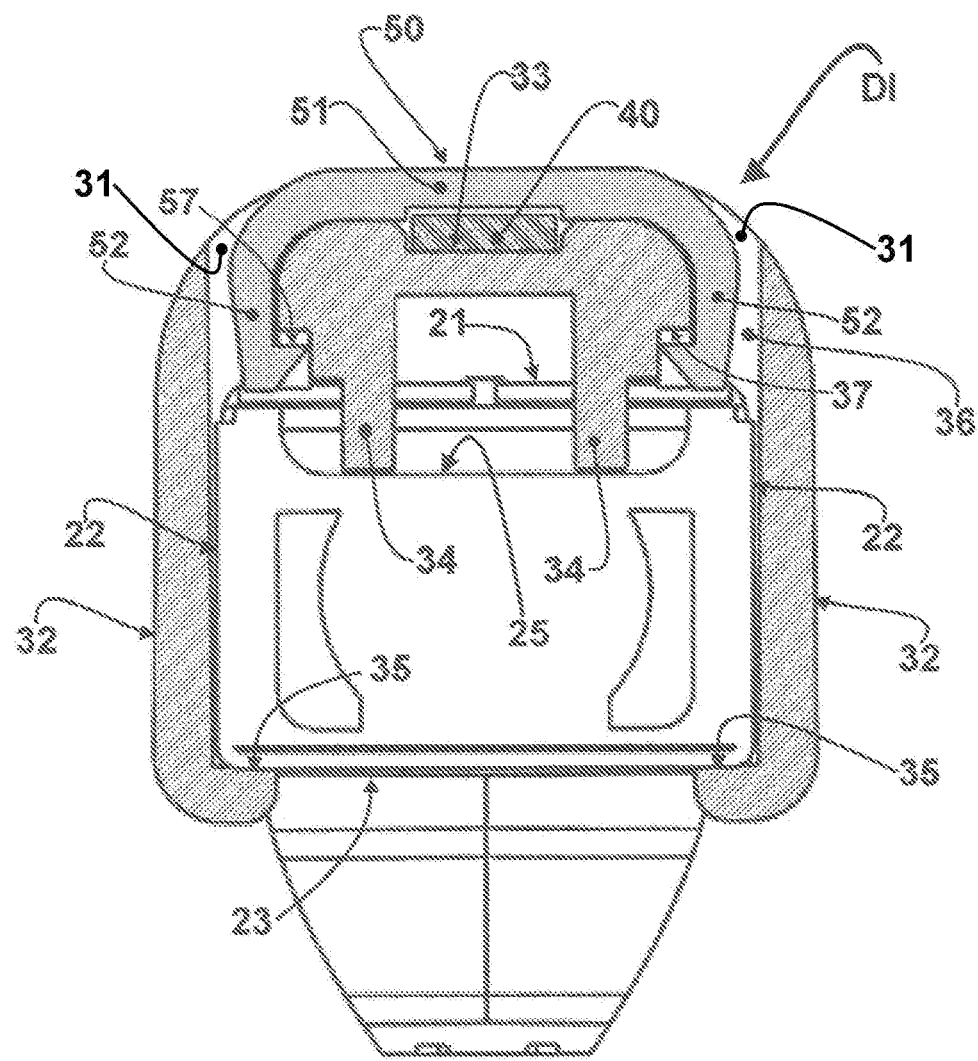
FIG. 7 represents a cross-sectional view of the set illustrated in FIG. 5.

As illustrated and already mentioned, the present invention relates to an identifier device for patch cords in patch panels of telecommunication network, of the type that comprises a plurality of patch panels (not illustrated) that receive, respectively, external lines and internal lines (not shown), and which are usually mounted on structures installed in a suitable space, usually a room of restricted access.

As is known in the art, each connecting panel comprises, in its front region, a plurality of panel ports well known in the art and also not illustrated here, to be interconnected, two by two, in a previously ordered manner, by a patch cord 10 having, at each end, a connector 20, for example of the RJ45 type, to be fitted and retained in a respective port, of a pair of panel ports to be interconnected with each other.

Each connector 20 of a patch cord 10 has an upper face 21 provided with a crimping cavity 25, usually of rectangular contour, opposite side faces 22, generally flat and parallel to each other, and a lower face 23.

According to the invention, the identifier device ID comprises a one-piece body 30 in a "U" shape, preferably injected in a resistant and flexible electrically non-conductive polymeric material, such as polycarbonate, having a basic leg 31 to be seated against the upper face 21 of a respective connector 20 and provided with a housing 33, facing outwardly of the body 30, and with at least one projection 34, facing inwardly of the body 30 and to be fitted inside the crimping cavity 25.

In the illustrated and preferred construction, the at least one projection 34 of the basic leg 31, facing inwardly of the body 30, has a width, in the direction transverse to the "U" shape of the body 30, dimensioned to define a snug fitting of said projection 34 inside the crimping cavity 25, locking the body 30 against displacements in the longitudinal direction of the connector 20.

In the embodiment illustrated in the drawings, the body 30 is provided with two inwardly facing projections 34, spaced apart in the direction of the basic leg 31, both having their width dimensioned to be fitted, snugly, inside the crimping cavity 25, axially locking the body 30 with respect to the connector 20.

The locking of the body 30 against displacements in directions orthogonal to the axial geometric axis of the connector 20 is achieved with a body 30 further having two side legs 32 to be seated against the respective opposite side faces 22 of the connector 20, each side leg 32 incorporating an inner end tooth 35 to be seated against the lower face 23 of the connector 20.

The side legs 32 of the body 30 are elastically deformable outwards, to position the respective inner end teeth 35 externally to the abutting side faces 22 of the connector 20, during the assembly, by simple engagement, of the body 30 around the respective connector 20.

After passing through the abutting side faces 22 of the connector 20, with the side legs 32 of the body 30 elastically deformed outwards, the inner end teeth 35 are displaced, by the elastic memory of the side legs 32, to the position of engagement under the respective opposing marginal portions of the lower face 23 of the connector 20, with the basic leg 31 of the body 30 seated against the upper face 21 of the connector 20.

Thus, the installation of the identifier device only requires access to the upper face 21 of the connector 20, allowing that said installation to be carried out with the connector kept fitted in a respective panel port connection, without the need of disconnecting the patch cord.

With the construction described above, the body 30, after being fitted around the connector 20, remains transversely and axially locked in the latter, without requiring any tool or complex and time-consuming operation, being positioned externally adjacent to a respective port of panel of a patch panel, in which the connector 20 is fitted.

In order to facilitate the fitting of the body 30 to the connector 20, the inner end teeth 35 of the side legs 32 are externally and inferiorly rounded, to cause the elastic deformation of the side legs 32 outwards, during the fitting operation of the body 30, facilitating the passage of the inner end teeth 35 through the side faces 22 of the connector 20. Despite being easy to fit into the connector 20, the construction of the body 30 and its positioning next to the panel port make its disassembly impractical, by means of the non-destructive opening of the side legs 32 and the release of the inner end teeth 35, without the connector 20 being disconnected from the panel port.

The identifier device ID further comprises an identifier tag 40, positioned inside the housing 33 and containing passive electronic memory and capable of communicating via radio frequency (RF) and storing data relating to the individual identification of the respective patch cord 10 at whose ends the two connectors 20 are fitted, each affixing a respective identifier tag 32.

The housing 33 of the body 30 is closed by a cover 50 that can be fitted and retained on the basic leg 31 of the body 30, retaining the identifier tag 40 protected from external agents and mechanically secure in its operational position.

To make the non-destructive opening of the cover 50 impracticable, with the body 30 mounted on the connector 20 and with the latter fitted to a panel port, the housing 33 of each body 30 is defined inside a recess 36 in an inverted "U" shape, provided along the longitudinal extent of the basic leg 31 and having opposite ends, in each of which a step 37 facing downwards is internally formed. To match the recess 36, the cover 50 has an inverted "U" shape, which can be fitted into the recess 36, having a base 51, covering and closing the housing 33, and two side flaps 52 each incorporating an inner end tooth 57 to be fitted, after elastic deformation of the side flaps 52, and retained under a respective step 37 of the recess 36. With this construction, the cover 50 remains fully housed inside the recess 36, with its inner end teeth 57 inferiorly and externally chamfered to facilitate its fitting inside the recess 36, but making the non-destructive disengagement impractical, particularly with connector 20 fitted to a panel port.

The identifier tags 40 associated with each patch cord 10 contain the same individual identification data of the respective patch cord 10. The identifier tag 40 does not require additional circuits or an external antenna, being totally passive.

The identifier tag 40, used in the identifier device ID, contains a small electronic memory that allows a simple and quick insertion of data in the identifier tags 40, before they are positioned and retained in the housing 33 of each body 30 and even before the latter is quickly and easily fitted onto a corresponding connector 20. Thus, existing cabling without individual identification can be easily added to the identifier devices in question, without the need for replacement.

The identifier tag 40, arranged in the housing 33 of the body 30 fitted to each connector 20, provides, by wireless communication, to a non-illustrated tracking module, signals representative of the identifier data of the respective patch cord 10 and stored in its electronic memory, so that such data can be captured, digitized and stored for later processing to track the interconnections being carried out or rearranged in the set of patch panels.

The invention claimed is:

1. An identifier device for patch cords of telecommunication network patch panels, each of the opposite ends of a patch cord (10) carrying a connector (20) having an upper face (21) provided with a crimping cavity (25), opposite side faces (22) and a lower face (23), the identifier device (ID) comprising: a body (30) in a single piece in a "U" shape, having a basic leg (31) to be seated against the upper face (21) of a respective connector (20) and provided with a housing (33), facing outwardly of the body (30), and with at least one projection (34), facing inwardly of the body (30) and to be fitted into the crimping cavity (25), the body (30) further having two side legs (32) to be seated against the respective opposite side faces (22) of the connector (20), and each incorporating an inner end tooth (35) to be seated against the lower face (23) of the connector (20); an identifier tag (40), positioned inside the housing (33) and containing passive electronic memory and capable of storing identification data of a respective patch cord (10); and a cover (50) attachable to the basic leg (31) of the body (30), closing the housing (33) and retaining the identifier tag (40) within the latter.

2. The identifier device according to claim 1, wherein the side legs (32) of the body (30) are elastically deformable outwards, positioning the respective inner end teeth (35) externally to the abutting side faces (22) of the connector (20).

3. The identifier device according to claim 1, wherein the at least one projection (34) of the basic leg (31), facing inwardly of the body (30), has a width dimensioned to define a snug fitting of said projection (34) inside the crimping cavity (25), locking the body (30) against displacements in the longitudinal direction of the connector (20).

4. The identifier device according to claim 3, wherein each body (30) is provided with two inwardly facing projections (34), spaced apart in the direction of the basic leg (31), both having their width fitted snugly inside the crimping cavity (25).

5. The identifier device according to claim 1, wherein the housing of each body (30) is defined inside a recess (36) in an inverted "U" shape, provided along the longitudinal extent of the basic leg (31) and having opposite ends, in each of which a step (37) facing downwards is internally formed, with the cover (50) having an inverted "U" shape, fitting into the recess (36), with a base (51) covering and closing the housing (33) and with two side flaps (52) each incorporating an inner end tooth (57) to be fitted, by elastic deformation, and retained under a respective step (37) of the recess (36).

6. The identifier device according to claim 5, wherein the cover (50) is fully housed inside the recess (36).

7. The identifier device according to claim 1, wherein the inner end teeth (57) of the side flaps (52) of the cover (50) are externally and inferiorly chamfered.

8. The identifier device according to claim 1, wherein the inner end teeth (35) of the side legs (32) of the body (30) are externally and inferiorly rounded.

\* \* \* \* \*